United States Patent [19]

Genovese et al.

[11] Patent Number: 5,643,393
[45] Date of Patent: Jul. 1, 1997

[54] METHOD FOR ACCESSING OPTICAL RIBBON FIBERS IN MIDSPAN

[75] Inventors: Michael D. Genovese; Gregory A. Lochkovic, both of Conover; Gregory A. Mills, Claremont, all of N.C.

[73] Assignee: Siecor Corporation, Hickory, N.C.

[21] Appl. No.: 684,879

[22] Filed: Jul. 25, 1996

[51] Int. Cl.⁶ .................................................. B32B 35/00
[52] U.S. Cl. ................................................. 156/344; 156/584
[58] Field of Search .................................. 156/344, 584; 29/564.4; 81/9.4

[56] References Cited

U.S. PATENT DOCUMENTS

| | | | |
|---|---|---|---|
| 5,460,682 | 10/1995 | Beasley et al. | 156/344 |
| 5,460,683 | 10/1995 | Beasley et al. | 156/344 |

FOREIGN PATENT DOCUMENTS

| | | | |
|---|---|---|---|
| 59-12831 | 1/1984 | Japan | 156/344 |

OTHER PUBLICATIONS

Sumitomo Recommended Procedure #SP–F02–007 (Jul. 1994).

"Meeting the Demands of the Local Loop with Improved Ribbon Midspan Access" 10th Annual National Fiber Optic Encineers' Conference (NFOEC) (Jun. 1994).

*Primary Examiner*—Mark A. Osele
*Attorney, Agent, or Firm*—J. David Abernethy

[57] ABSTRACT

A method for accessing individual coated optical fibers in an optical fiber ribbon includes securing an adhesive tape to a substrate surface. The adhesive tape has a backing which faces away from the substrate surface to which it is secured. A glue is placed on the tape backing. The optical fiber ribbon is placed over the glue. After the glue is set, the optical fiber ribbon is pulled to burst the optical fiber ribbon common coating and delaminate one surface of the optical common coating. The process may be repeated to delaminate the other surface of the common coating.

10 Claims, 3 Drawing Sheets

METHOD FOR ACCESSING OPTICAL RIBBON FIBERS IN MIDSPAN

BACKGROUND OF THE INVENTION

This invention relates to methods for midspan entry of optical fiber ribbons to access one or more optical fibers incorporated in the optical fiber ribbon.

Optical fiber ribbons include a plurality of individually coated optical waveguides, herein called optical fibers, which are held in parallel relationship to each other by an outer common coating. Each coated optical fiber typically includes a corn and cladding, primary and secondary coatings formed of plastic material, and an outer colored layer. The colored layer may be formed of a mixture of clear plastic material and pigment. Each coated optical fiber within a single optical fiber ribbon often is given a different color from that used in the other optical fibers in the ribbon in order that optical fibers within the ribbon may be identified and distinguished from each other. The outer common coating typically has two flat major surfaces separated by a thickness which is smaller than the width of the major surfaces.

Although some optical fiber ribbons have comprised a parallel array of coated optical fibers held between tapes, most optical fiber ribbons produced today comprise an outer common coating which encapsulates the coated optical fibers. The primary and secondary coatings, colored layer, and outer common coating may all be formed of ultraviolet curable materials. Urethane acrylate resins are frequently used as such ultraviolet curable materials. The coated optical fibers may be disposed in touching relation, or they may be completely separated by the outer common coating.

Optical fiber ribbons formed of optical fibers held between tapes can be relatively easy to peel in order to access the coated optical fibers therein. Accessing the coated optical fibers, particularly in the midspan of a cable, has been more difficult when they are encapsulated by the outer common coating. Therefore, efforts have been directed toward developing optical fiber ribbons in which the outer common coating may be removed from the coated optical fibers without damaging them. U.S. Pat. No. 4,176,910, assigned to Siemens AG, describes an optical fiber ribbon in which each coated optical fiber is coated by a layer of separating and lubricating material. Other publications also describe various methods for providing optical fiber ribbons which have good peelability of the outer common coating in order to reduce the difficulty in accessing the coated optical fibers.

Cables including optical fiber ribbons advantageously may benefit from mass splicing. However, traditional loose tube type optical fiber non-ribbon cables have not presented the problem of separating individual coated optical fibers from a ribbon. All advantages and disadvantages of each type of cable, and the possibility of future sheath entries in midspan, must be considered in order to select the optimal cable for a particular location. Labor costs for work in the field must be considered in the selection process.

A method for midspan entry of optical fiber ribbons is described in U.S. Pat. No. 5,460,683. This method includes placing a single or double sided adhesive tape on a support surface with its top surface having exposed adhesive. A plastic semi-flexible plastic card is secured to one end of the tape, and the tape and card are secured to a support surface. A length of optical fiber ribbon is placed on the exposed top surface of the tape and across the card. The portion of the ribbon overlying the card is lifted, and glue is placed on the card. The ribbon is then laid down onto the glue and the card. The ribbon is then lifted to cause the glue to rupture the common coating. By continuing to lift the ribbon, the lower common coating portion of the remainder of the ribbon length may be delaminated to access the coated optical fibers.

The adhesion of many prior art optical fiber ribbons which are not designed for easy peelability has so far been demonstrated to be too minimal to allow peeling by the method described in the '683 patent. While the method of the '683 patent causes an initial rupture of the common coating matrix, the peel does not sufficiently propagate beyond the card.

Another disadvantage of the method above described is that the card is not readily available and must be provided to the craftsperson in a midspan access kit. If the supply of cards becomes exhausted in the field, temporary expedients must be found. The craftsperson then must return to a supply area to obtain more cards, and possibly must wait until they can be shipped from a supplier.

Alternative methods include applying the glue directly onto a support surface and delaminating the optical fiber ribbon without the use of an adhesive tape. The support surface may be provided with upstanding sidewalls to aid in keeping the optical ribbon in line during lamination. However, the support surface then is littered with dried glue.

SUMMARY OF THE INVENTION

It is therefore an object of the present invention to provide a reliable method for midspan access of optical fiber ribbons using only materials which are readily available in most local hardware and building supply stores.

This and other objects are provided, according to a first embodiment of the present invention, by a method for delamination of an optical fiber ribbon in which at least two aligned beads of glue, or a continuous line of glue, is placed on an immobilized substrate surface. The length of optical fiber ribbon to be delaminated is placed over the glue, and the glue is allowed to set. At least a portion of the optical fiber ribbon length is lifted away from the substrate surface, thereby causing the glue to rupture a portion of an outer common coating of the optical fiber ribbon to initiate the delamination thereof from coated optical fibers incorporated within the optical fiber ribbon length. By continuing to lift the optical fiber ribbon length or portion thereof, the delamination may then be continued.

Use of a disposable tape as a substrate surface facilitates disposal of the glue used during the delamination process. The tape includes a first major lateral surface which has exposed adhesive thereon. This first major lateral surface is adhered to a support surface. In a departure from the prior art, the second major lateral tape surface, which faces away from the support surface, is a backing material which exposes no adhesive. At least one bead of glue is disposed onto the tape backing. The flat optical fiber ribbon to be accessed has two major lateral surfaces and incorporates a plurality of coated optical fibers encapsulated in an outer common coating. A major lateral surface of the selected length of optical fiber ribbon is laid onto the tape backing such that the glue contacts and adheres to the optical fiber ribbon outer common coating.

At least a portion of the optical fiber ribbon length is then lifted away from the support surface, thereby causing the outer common coating of the optical fiber ribbon to rupture. This rupture initiates the delamination of the optical fiber ribbon outer common coating from the coated optical fibers incorporated within the optical fiber ribbon. This delamination is propagated by continuing to lift the length of optical fiber ribbon away from the support surface.

It has been found that satisfactory delamination is achieved without the use of an upwardly facing adhesive surface on the tape. Advantageously, a single strip of tape thus may be reused simply by clearing away delaminated coating strips and placing additional drops of glue on any unglued portion of the tape backing. By working across the width of the tape and down the length of the tape, many delaminations can be achieved using only one tape having a backing thereon. The amount of tape used is thereby minimized, and the advantage of tape as a disposable substrate surface for delamination is retained. By depositing glue on the tape backing and removing used tape, the support surface is kept clean of glue residue.

Of course, the improved method can be used to delaminate both optical fiber ribbon major lateral surfaces to completely free the coated optical fiber portions within the length from the ribbon outer common coating.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

The inventive method may be used to access individual coated optical fibers incorporated in optical fiber ribbons at both cable ends and at mid-span points. The coated optical fibers are accessed by removing the common coating matrix material which encapsulates the coated optical fibers.

Individual fiber access is usually performed at the free end of an optical fiber ribbon. Individual fiber access may be necessary due to the splicing method being used or to splice point configurations. Accessing individual optical fibers at a midspan point of an optical fiber ribbon may be performed when communications traffic exists on some of the other optical fibers in the ribbon. However, such traffic should be rerouted during the access procedure whenever possible.

Figure 1:
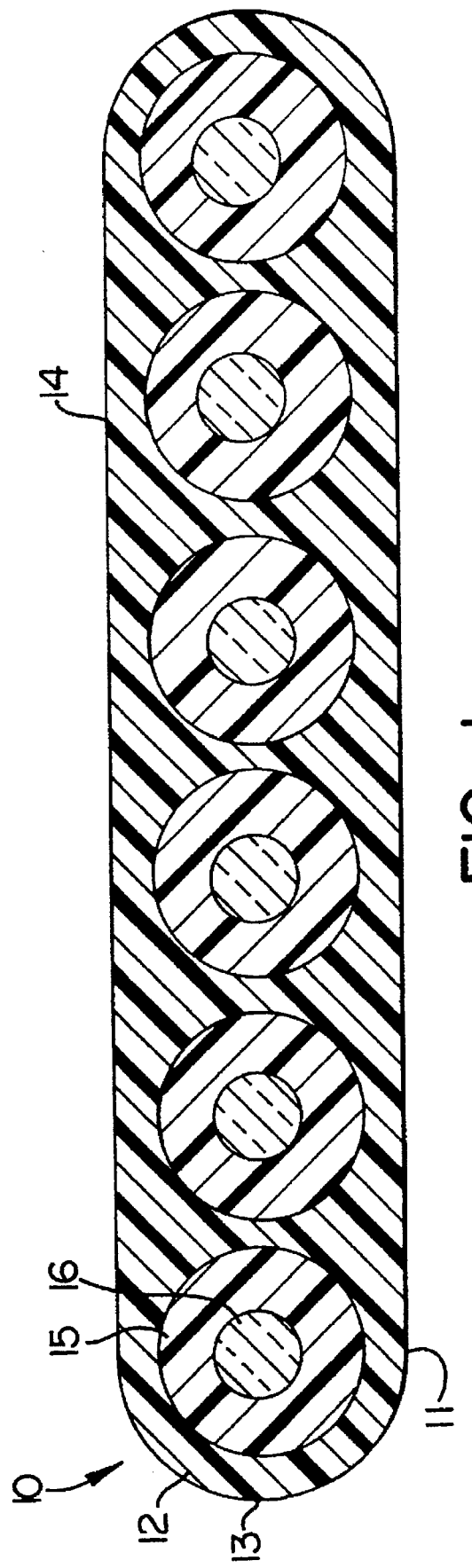
FIG. 1 is a cross-sectional view of a conventional optical fiber ribbon.

The craftsperson first removes the cable outer sheath and other components as necessary to gain access to the optical fiber ribbon on which the inventive procedure is to be performed. A conventional optical fiber ribbon 10, shown in FIG. 1, comprises a plurality of individual coated optical fibers arranged in a parallel array. Each coated optical fiber comprises a central glass portion 16 including a core and a cladding; an individual coating 15, which may comprise either one or a plurality of layers; and a common coating matrix 12. Both individual coatings 15 and common coating 12 may be formed from liquid urethane acrylate material which has been cured by irradiation with ultraviolet light to form a solid layer. An optical fiber ribbon has two major lateral surfaces 11, 14 separated by a thickness 13. It is helpful if the optical fiber ribbon to be accessed has the property of relatively good peelability of the common coating matrix 12 from the individual optical fiber coatings 15.

Figure 2:
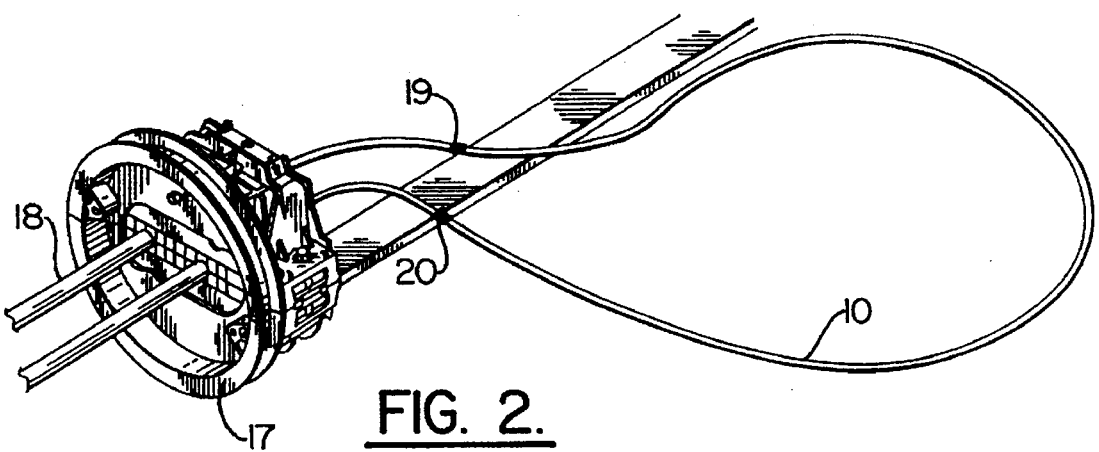
FIG. 2 is a perspective view of an optical fiber ribbon slack loop to be delaminated.

With reference to FIG. 2, the cable 18 to be accessed is mounted in a prepared splice closure or other hardware along with any required drop cable. For ease of comprehension, only the end cap 17 and a support bar of a splice closure is shown. Care must be taken not to damage the exposed ribbons while cable 18 is mounted in the closure end cap. The ribbon 10 to be accessed is identified and separated from the other ribbons. Using a tape measure, the desired breakout ribbon length is measured and the end points recorded with a permanent marker. The ribbon may then be wrapped at the marks with vinyl tape 19, 20 or number markers.

Figure 3:
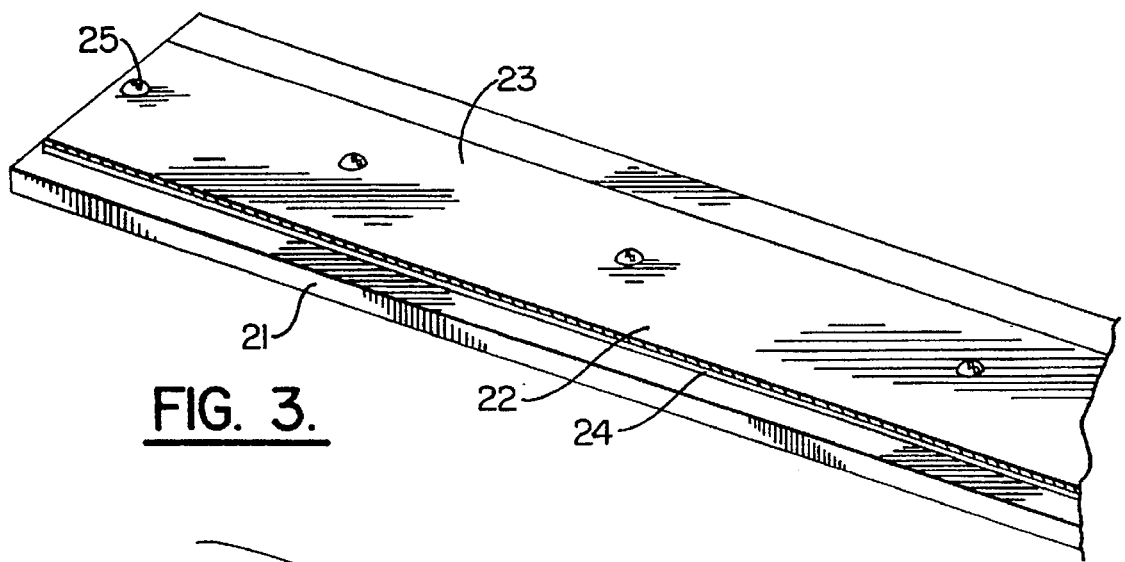
FIG. 3 is a perspective view of glue applied to the backing of an adhesive tape mounted to a work board.

Work on the ribbon should be performed on a solid, flat support surface if one is available. If none is available, or if there is little work space, a portable board 21 (see FIG. 3), which is formed of a suitably stiff material such as plastic or wood, may be used as a support surface. The portable support surface board may be either flat or curved.

A single side adhesive tape 22 has two major surfaces: adhesive surface 24 and backing 23. Adhesive surface 24 is applied to the board 21. The tape backing 23 thereby faces away from board 21. A tape having an unfinished cloth backing is acceptable for this purpose. An example of such a tape is Shurtape no. PC 690 made by Shuford Mills of Hickory, N.C. Medical tapes, such as those commonly used to wrap ankles and other joints in athletics, also may be used. An example is Curity "3-Cut" Wet-Pruf Adhesive Tape, code no. 03155 manufactured by Kendall Co. of Mansfield, Mass. Cotton is a suitable cloth for use as the tape backing. Tapes having a vinyl backing also have proven to be acceptable.

Some tapes have a backing including a release constituent. When removing tape from the outer end of a roll of tape, the release constituent aids in peeling the tape end from the underlying tape layer with a uniform degree of force. However, in tapes used to practice this invention, the backing 23 preferably should be unfinished, with no release constituents. Release constituents may prevent the glue from properly setting and/or bonding.

One or more drops of glue 25 are then applied to the upwardly facing surface of tape backing 23. Acceptable glues may be cyanoacrylate ester based. Glues which have proven acceptable for use include Loctite 495 Superbonder 49550 and Devcon ZipGrip Instant Bonding 4404. In the alternative, a continuous line of glue 25 may be applied to tape backing 23. A continuous line of glue may be necessary to peel prior art optical ribbons which have not been designed for easy peelability.

A major surface 11 of the section of ribbon 10 to be delaminated is then placed over the glue 25. A spatula may be used to gently press on the ribbon section 10 to ensure that the ribbon is in firm contact with the glue. Ribbon section 10 should be securely held during this process to prevent it from twisting or sliding off of the tape. Glue 25 then is allowed to set.

Figure 4:
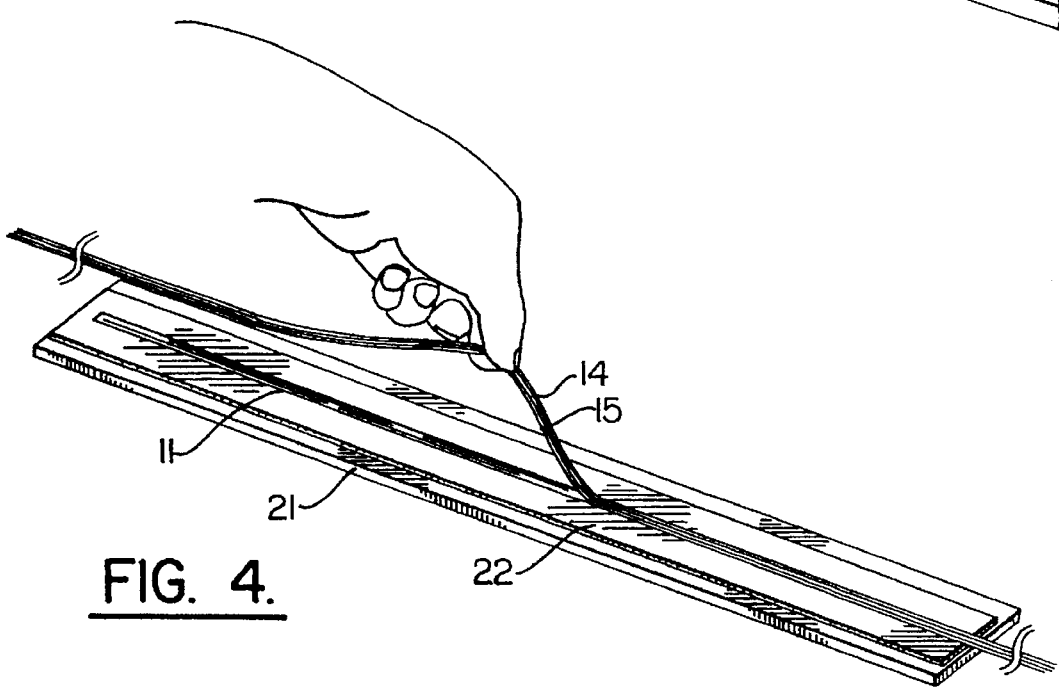
FIG. 4 is a perspective view of the delamination of the optical fiber ribbon; and, FIG. 5 is a perspective view of the delamination of an optical fiber ribbon which is a part of an optical fiber ribbon stack.

After glue 25 has set, the craftsperson lifts one side of ribbon 10 (FIG. 4), causing glue 25 to cause a rupture through the surface 11 of common coating 12, initiating delamination of the side of common coating 12 which includes surface 11. By continuing to lift the ribbon, the craftsperson propagates the delamination of the side of common coating 12 which includes surface 11. Care should be taken not to bend the optical fiber ribbon too sharply during lifting. Surface 11 of common coating 12 thereby remains on the tape backing 23, leaving the upper surface 14 of common coating 12 along with optical fibers 16 and their individual coatings 15. Of course, the process may be repeated to delaminate the side of common coating 12 which includes surface 14 to fully access the individually coated optical fibers 16. The common coating 12 may be scored or abraded prior to ribbon delamination if ribbon 10 otherwise would be difficult to delaminate.

If the length of the substrate is shorter than the required breakout length, the forgoing steps may be repeated in order to remove the common coating 12 from the complete distance between tapes 19, 20.

A clean tissue or cloth soaked in alcohol may be used to clean the separated optical fibers.

An optical fiber to be spliced then is cut. To preserve a maximum optical fiber length for splicing, the optical fiber should be cut as closely as possible to an end of the tube or other carrier which holds the optical fiber ribbons. After splicing, the optical fiber or fibers then may be loaded into a splice tray.

Figure 5:
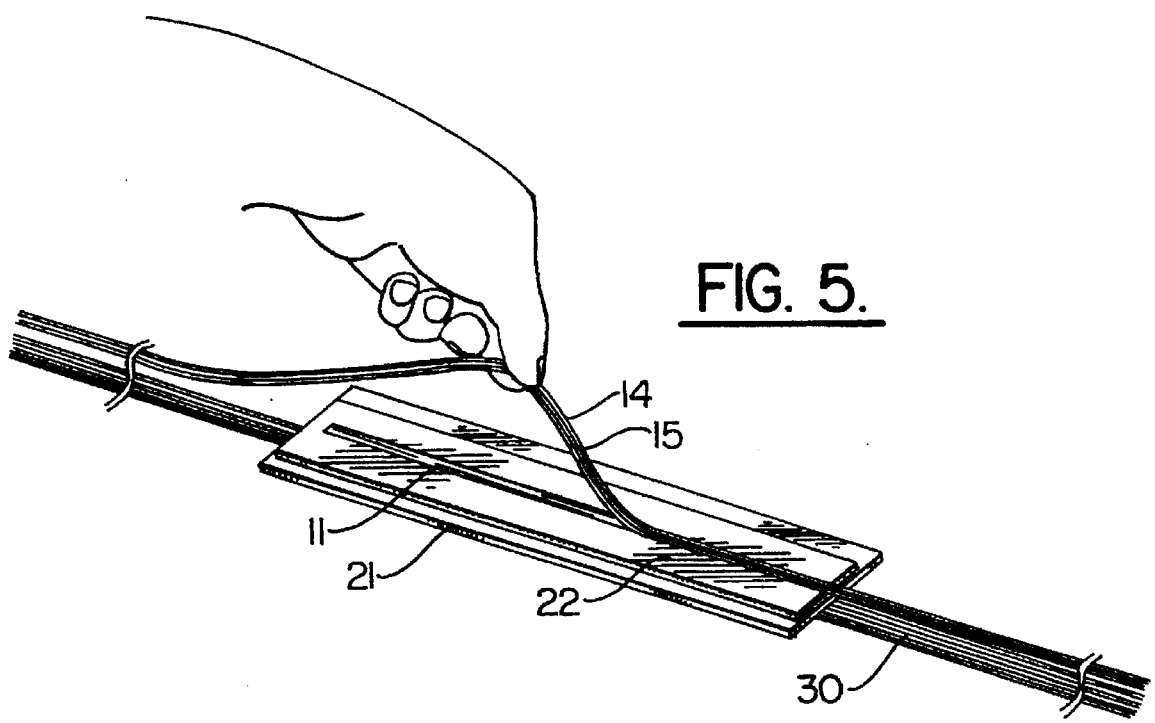

Refer to FIG. 5. Some cables include one or more stacks of optical fiber ribbons. It may be necessary to delaminate one optical fiber ribbon without disturbance of the other optical fiber ribbons in its stack while little or no cable slack is available. In this situation, support surface board 21 may be inserted between the optical fiber ribbon to be delaminated and other ribbons in optical fiber ribbon stack 30. If possible, board 21 may be clamped so as to remain immobile during use, thereby not disturbing other ribbons in stack 30. Otherwise, the method used is the same as that above described.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A method of removing the outer common coating from a length of optical fiber ribbon to provide access to one or more coated optical fibers within said optical fiber ribbon, said method comprising the steps of:

providing a strip of adhesive tape having first and second major surfaces, said first major surface having exposed adhesive thereon and said second major surface being a backing material exposing no adhesive;

placing said first major surface of said strip onto a support surface, thereby securing said strip thereto with the said backing facing away from said support surface;

placing an amount of glue onto said backing, and placing a major lateral surface of said optical fiber ribbon onto said glue, thereby securing at least a portion of said length to said strip;

lifting at least a portion of said optical fiber ribbon length away from said support surface, thereby causing said glue to rupture a portion of said optical fiber ribbon outer common coating to initiate delamination thereof from coated optical fibers incorporated within said optical fiber ribbon length; and propagating the delamination of said optical fiber ribbon common coating forming said ribbon major lateral surface from coated optical fibers incorporated within said optical fiber ribbon length by continued lifting of at least a portion of said optical fiber ribbon away from said support surface.

2. A method as set out in claim 1, wherein said support surface is curved.

3. A method as set out in claim 1 wherein said backing is formed of cloth.

4. A method as set out in claim 3, wherein said cloth is cotton.

5. A method as set out in claim 1, wherein said backing is formed of a vinyl material.

6. A method as set out in claim 1, wherein a continuous line of said glue is applied to said backing.

7. A method as set out in claim 1, wherein one or more unconnected drops of glue are applied to said backing.

8. A method as set out in claim 1, wherein said backing contains no release constituents.

9. A method of removing the outer common coating from a length of optical fiber ribbon to provide access to one or more coated optical fibers within said optical fiber ribbon, said optical ribbon being in a stack of optical fiber ribbons, said method comprising the steps of:

providing a strip of adhesive tape having first and second major surfaces, said first major surface having exposed adhesive thereon and said second major surface being a backing material exposing no adhesive;

placing said first major surface of said strip onto a portable support surface, thereby securing said strip thereto with the said backing facing away from said support surface;

placing an amount of glue onto said backing, and inserting said support surface between optical fiber ribbons comprising said stack;

placing a major lateral surface of an optical fiber ribbon onto said glue, thereby securing at least a portion of said length to said strip;

lifting at least a portion of said glued optical fiber ribbon length away from said support surface, thereby causing said glue to rupture a portion of said optical fiber ribbon outer common coating to initiate delamination thereof from coated optical fibers incorporated within said optical fiber ribbon length; and propagating the delamination of said optical fiber ribbon common coating forming said ribbon major lateral surface from coated optical fibers incorporated within said optical fiber ribbon length by continued lifting of at least a portion of said optical fiber ribbon away from said support surface.

10. A method as set out in claim 9, wherein said backing contains no release constituents.

* * * * *